United States Patent
Hashimoto

(10) Patent No.: US 7,411,615 B2
(45) Date of Patent: Aug. 12, 2008

(54) IMAGE PICKUP APPARATUS

(75) Inventor: Seiji Hashimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 770 days.

(21) Appl. No.: 10/660,885

(22) Filed: Sep. 12, 2003

(65) Prior Publication Data

US 2004/0051791 A1    Mar. 18, 2004

(30) Foreign Application Priority Data

Sep. 13, 2002  (JP)  ............................. 2002-268179

(51) Int. Cl.
  *H04N 5/235* (2006.01)
  *H04N 9/73* (2006.01)
(52) U.S. Cl. .............. 348/226.1; 348/227.1; 348/228.1; 348/229.1
(58) Field of Classification Search ................. 348/308, 348/226.1–229.1, 371, 370, 223, 226, 222, 348/447; 382/124, 116
  See application file for complete search history.

(56) References Cited

U.S. PATENT DOCUMENTS

| | | | |
|---|---|---|---|
| 4,710,807 A * | 12/1987 | Chikama | ..................... 348/68 |
| 5,255,077 A * | 10/1993 | Yamazaki et al. | ........ 348/226.1 |
| 5,292,238 A * | 3/1994 | Michalak | ....................... 425/9 |
| 5,781,651 A * | 7/1998 | Hsiao et al. | ................. 382/127 |
| 6,295,085 B1 * | 9/2001 | Munson et al. | .......... 348/226.1 |
| 6,426,776 B1 | 7/2002 | Ochi | |
| 6,710,818 B1 * | 3/2004 | Kasahara et al. | ............ 348/607 |
| 7,034,870 B2 * | 4/2006 | Nagaoka et al. | .......... 348/228.1 |
| 7,187,405 B2 * | 3/2007 | Poplin et al. | ............. 348/226.1 |

FOREIGN PATENT DOCUMENTS

| | | |
|---|---|---|
| CN | 1063307 C | 3/2001 |
| JP | 3-10126 | 1/1991 |
| JP | 06-197269 | 7/1994 |
| JP | H07-177427 | 7/1995 |

OTHER PUBLICATIONS

English Abstract for Chinese Patent Application 1063307C.
Chinese Office Action dated Apr. 11, 2005.
English translation of Fig. 4 and paragraphs [0024] through [0027] of H07-177427.
Chinese Office Action Issued on Dec. 28, 2007 on a corresponding counterpart Chinese Application No. 2005100903220.

* cited by examiner

*Primary Examiner*—Tuan Ho
*Assistant Examiner*—Tuan H Le
(74) *Attorney, Agent, or Firm*—Morgan & Finnegan, LLP

(57) ABSTRACT

An image pickup apparatus comprises an image pickup unit including a plurality of photoelectric conversion units for picking up an image of an object; and a filter, arranged on the image pickup unit, for reducing a light amount that causes a flicker.

6 Claims, 11 Drawing Sheets

FIG. 3
PRIOR ART

FLUORESCENT LIGHT FLICKER (50Hz)
— 10ms —

φV (Ts)
— 100ms —

LONG PERIOD EXPOSURE

⇩ NO FLICKER IS GENERATED ON AN OUTPUT SIGNAL

FIG. 4
PRIOR ART

FLICKER (50Hz)
— 10ms —

φV (Ts)
— 2ms —

⇩ FLICKER IS GENERATED ON AN OUTPUT SIGNAL

SHORT PERIOD EXPOSURE (Ts<FLICKER PERIOD)

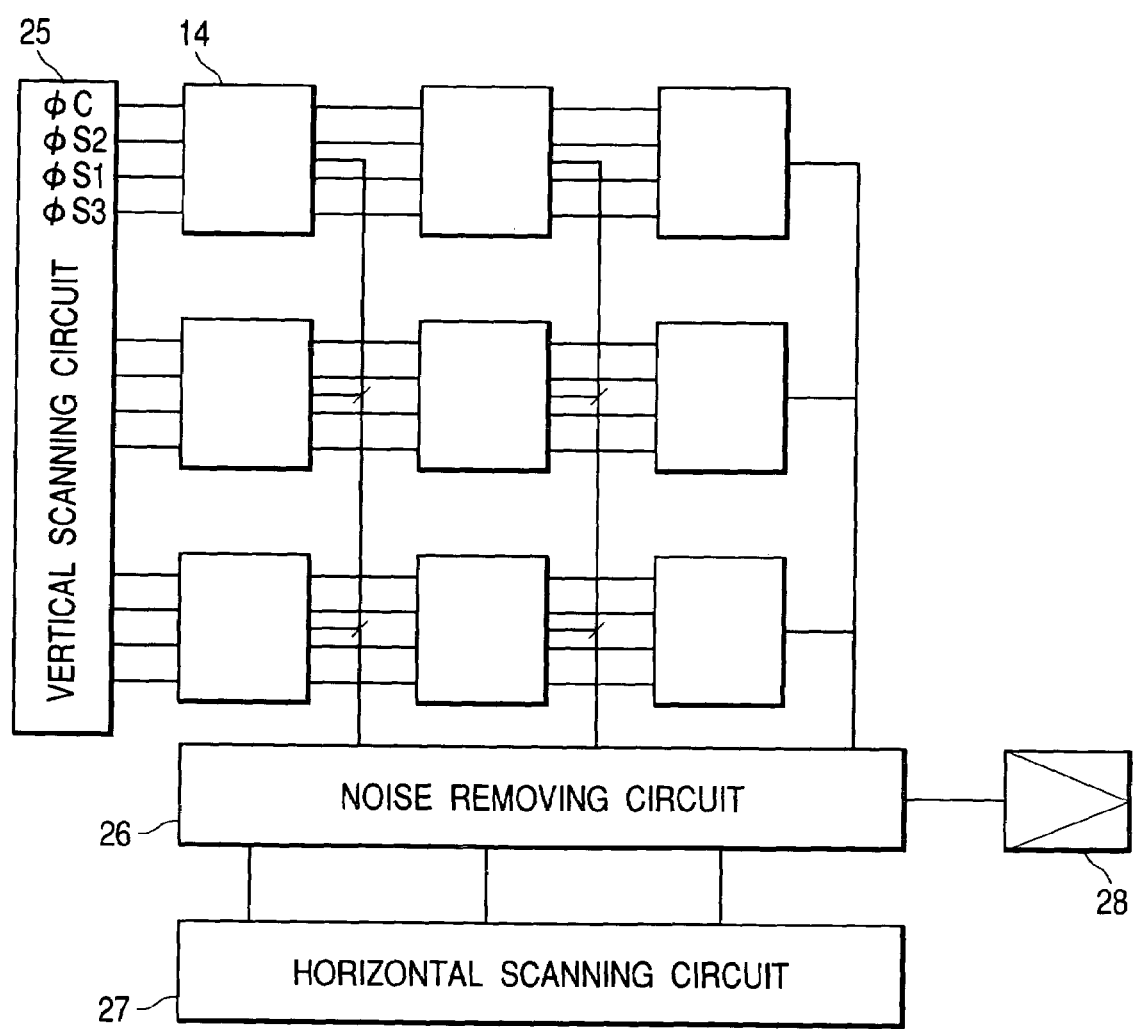

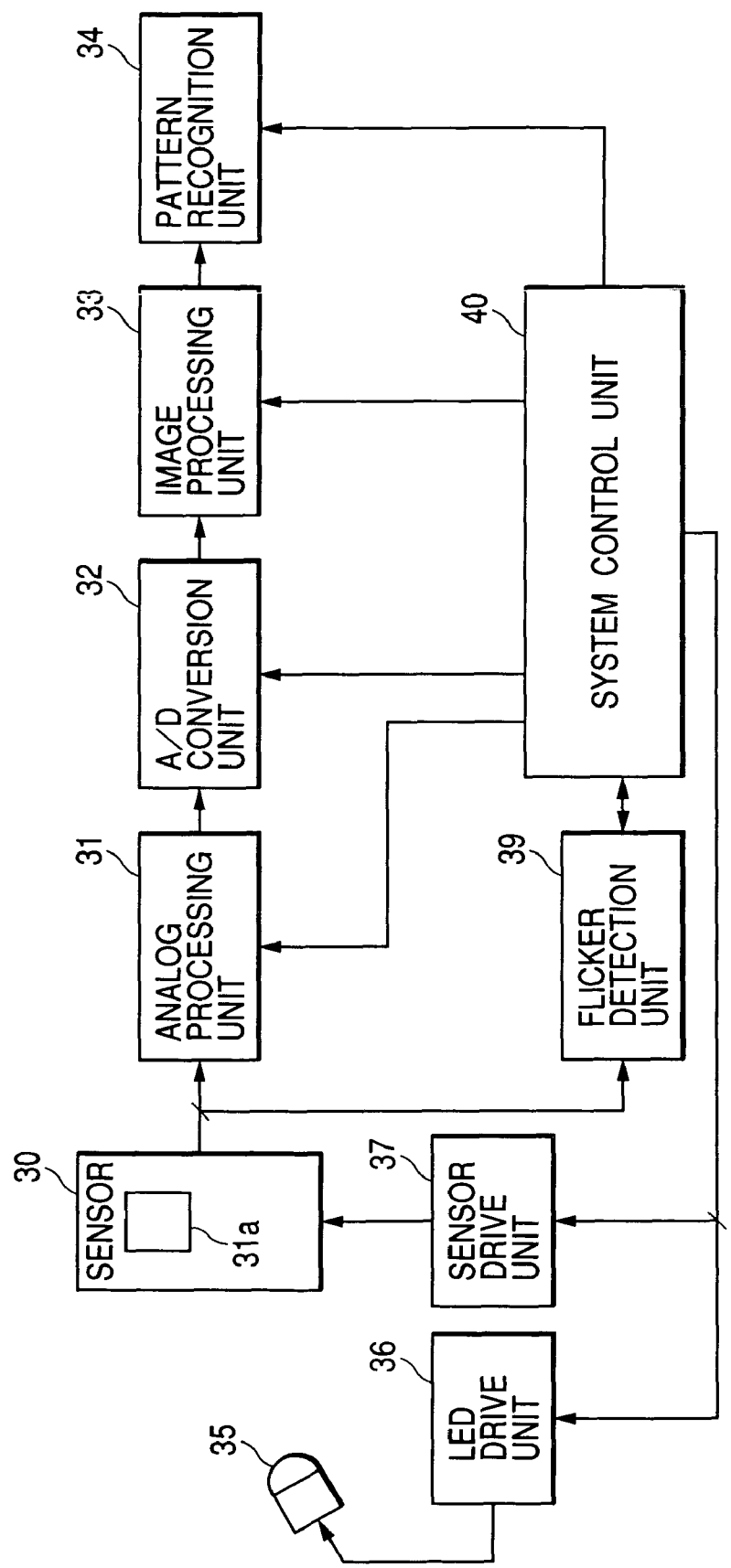

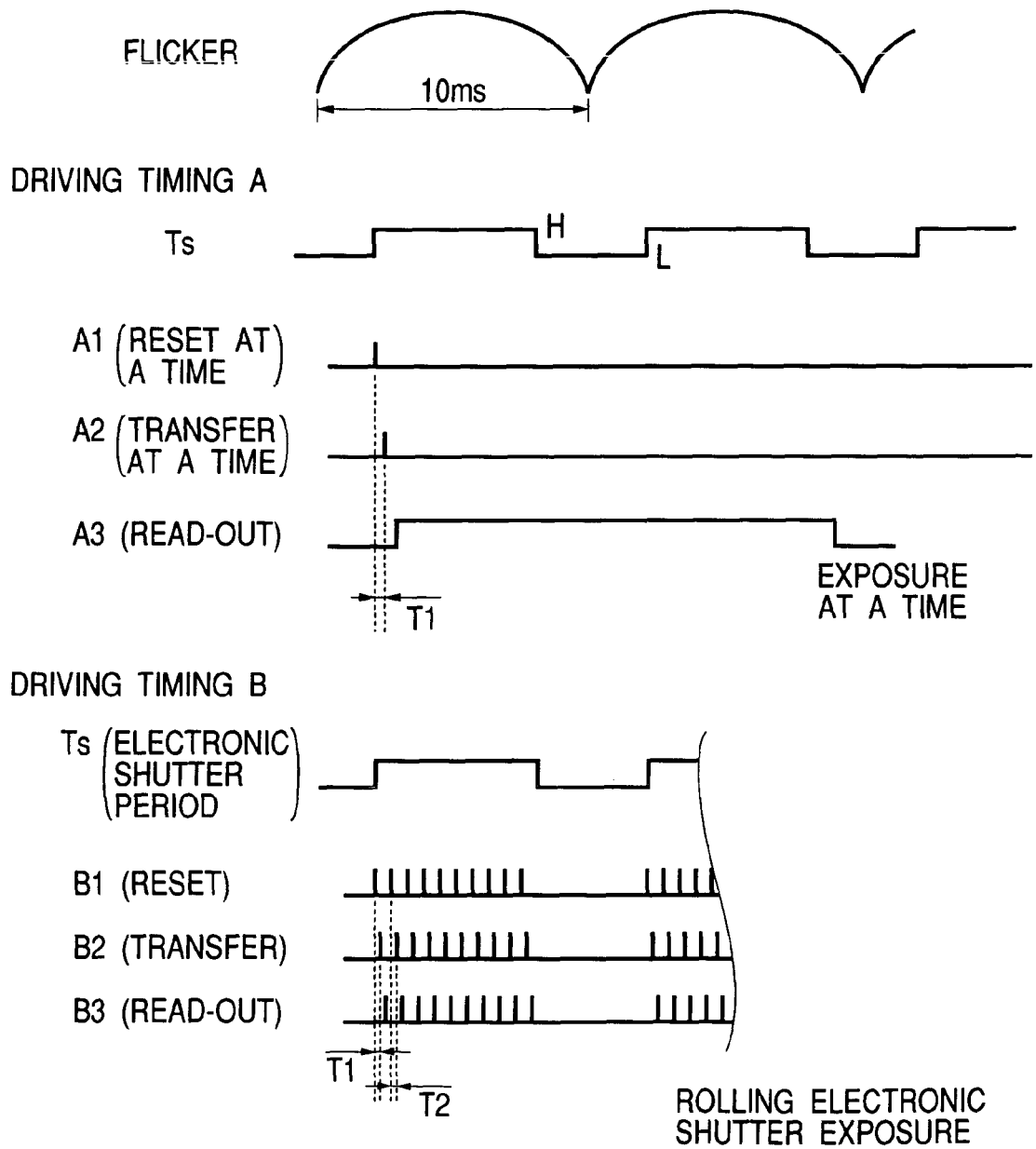

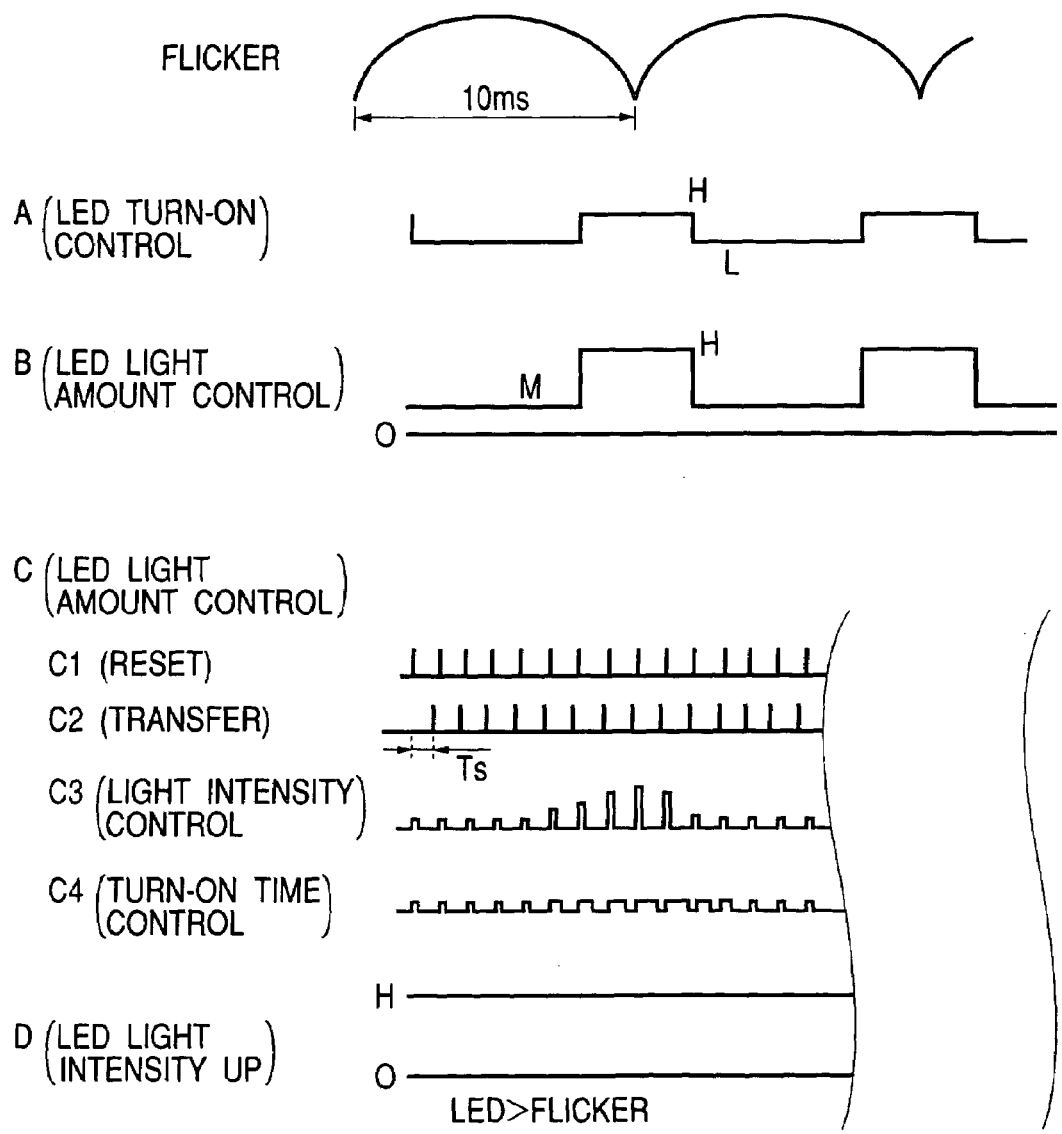

IMAGE PICKUP APPARATUS

BACKGROUND OF THE INVENTION

1. Field of the Invention

The present invention relates to an image pickup apparatus for picking up an image of an object.

2. Related Background Art

Conventionally, a fingerprint recognition apparatus is available that is used for fingerprint verification when a finger is positioned so as to directly contact a two-dimensional semiconductor sensor (an electrostatic type or an optical reading type). This fingerprint recognition apparatus has recently become very important in the company and individual security fields.

If the size, weight and price of the fingerprint recognition apparatus can be reduced, dramatic growth is expected in the market for business transactions for which portable telephones or other portable devices are employed.

The recognition accuracy of the electrostatic type sensor is low, however, when a finger is too dry, and attention has been drawn to the optical type because it provides excellent recognition accuracy for various finger types. An optical type fingerprint recognition apparatus is described in detail in Japanese Patent No. 310126.

Sensors used for the optical type apparatus are an area sensor shown in FIG. 1 and a line sensor shown in FIG. 2. In the above example, the optical sensor emits an LED light to irradiate a finger, and employs scattered LED light, which passes through the finger, to read as an image the surface roughness of the finger.

According to the fingerprint recognition apparatus that uses the area sensor, when a finger 1 is pressed against an area sensor 2, in the same manner as a seal, an LED is turned on and reads a fingerprint image.

According to the fingerprint recognition apparatus that uses the line sensor, a finger 1 is scanned by a line sensor 4 which includes several tens of pixel arrays, and an image of a fingerprint is read as a sensor signal.

For either type, the sensor output signal is processed by an image processing unit 5 to generate a fingerprint pattern that is compared by a pattern recognition unit 6 with a reference fingerprint pattern held in temporary storage. In this manner, fingerprint recognition can be performed.

In the image reading examples shown in FIGS. 1 and 2, the LED light is emitted to radiate the finger. Generally, equipment in which the fingerprint recognition apparatus is mounted is used inside under fluorescent light that commonly has a brightness of several hundred lx or so, or is used outside under the sun which has a brightness of at least several tens of thousands of lx. In order for an image of a fingerprint to be accurately read under these conditions, appropriate optical and sensitivity designs are required for a sensor.

Further, since for a sensor that is to be mounted in a portable apparatus a low price and low power consumption are demanded, a reduction in the size of the sensor and an increase in its sensitivity are required. However, to accurately read the image of a fingerprint, an LED whose preferable emission wavelength is 800 to 950 nm is required, and such an LED is very expensive and consumes a large amount of power.

Thus, a highly sensitive sensor is needed to reduce the required number of expensive LEDs and the LED driving current. However, when the sensitivity of a sensor is high, the sensor tends to become saturated. And since a reduced exposure time is needed to prevent the sensor from becoming saturated, an electronic shutter is required to attain a reduced exposure time. In this case, the following new problem is encountered.

A flicker is generated when an electronic shutter is driven for a short period of time under fluorescent light. An explanation for the flicker will now be given while referring to FIGS. 3 and 4.

In FIG. 3, as is well known, flicker of a period of 10 ms is generated by fluorescent light. Thus, when the exposure period of a sensor is several tens of ms or longer, variances in the integral values light amount are reduced. For example, when the length of an exposure period is 100 ms, as shown in FIG. 3, exposure variance is not a problem for a fingerprint sensor. When, however, as is shown in FIG. 4, rolling shutter driving, at a flicker period of 10 ms, is performed to expose sequentially an individual pixel row, a large flicker is generated in the output signal of the sensor.

Further, even when whole pixels are simultaneous exposed, if an image is read while a flicker is generated for a small amount of light, the SN ratio of the fingerprint image is greatly degraded and fingerprint recognition is impossible.

An explanation will now be given for outside use. Since an area sensor at least can obtain a plurality of images when a finger is pressed against it, feedback of the exposure condition can be performed and the sensor can be prevented from being saturated. However, for a scan type sensor, while multiple scanning determines the exposure condition, it is difficult to determine the exposure condition when only one scanning is preformed. This, therefore, is a serious problem, since the sensor becomes saturated and recognition of the fingerprint is not possible.

SUMMARY OF THE INVENTION

It is one objective of the present invention to obtain a high resolution image by reducing flicker.

To achieve this objective, according to one aspect of the present invention, an image pickup apparatus comprises: an image pickup unit for picking up an image of an object; a detection circuit for detecting flicker; and a correction circuit for adjusting an image pickup condition of the image pickup unit in accordance with a detection result of the detection circuit.

According to another aspect of the invention, an image pickup apparatus comprises: an image pickup unit including a plurality of photoelectric conversion units for picking up an image of an object; and a filter, arranged on the image pickup unit, for reducing the amount of light that causes a flicker.

According to an another aspect of the invention, an image pickup apparatus comprises: an image pickup unit including a plurality of photoelectric conversion units for picking up an image of an object; and a member arranged on the image pickup unit and including a silicon having a thickness of 50 to 100 μm.

According to an still another aspect of the invention, an image pickup apparatus comprises: an image pickup unit for picking up an image of an object; a light source arranged on a side face of the image pickup unit; a light shielding unit, arranged on a side face of the image pickup unit, for shielding light emitted by the light source; and a light guiding member, arranged on a side face of the image pickup unit, for guiding the light emitted by the light source.

Other objectives and features of the invention will become obvious during the course of the following specifications prepared while referring to the drawings.

BRIEF DESCRIPTION OF THE DRAWINGS

FIG. 3 is a diagram for explaining a flicker;

FIG. 4 is a diagram for explaining a flicker;

FIG. 7 is a diagram showing a CMOS sensor;

FIG. 8 is a diagram showing an image pickup apparatus according to a first to a fourth embodiment of the present invention;

FIG. 9 is a diagram for explaining the first embodiment;

FIG. 10 is a diagram for explaining the second embodiment;

DETAILED DESCRIPTION OF THE PREFERRED EMBODIMENTS

First Embodiment

A semiconductor sensor used for a first embodiment will now be described.

There are two types of systems (electronic shutters) for driving the semiconductor sensor of this embodiment: a whole pixel simultaneous shutter exposure and a rolling shutter exposure.

The whole pixel simultaneous shutter exposure is a driving method whereby the exposure timings (the exposure start time and the exposure end time) for all the pixels are the same.

The rolling shutter exposure is a driving system whereby the image pick-up process is performed by shifting the exposure timing every row or every several rows.

Figure 5:
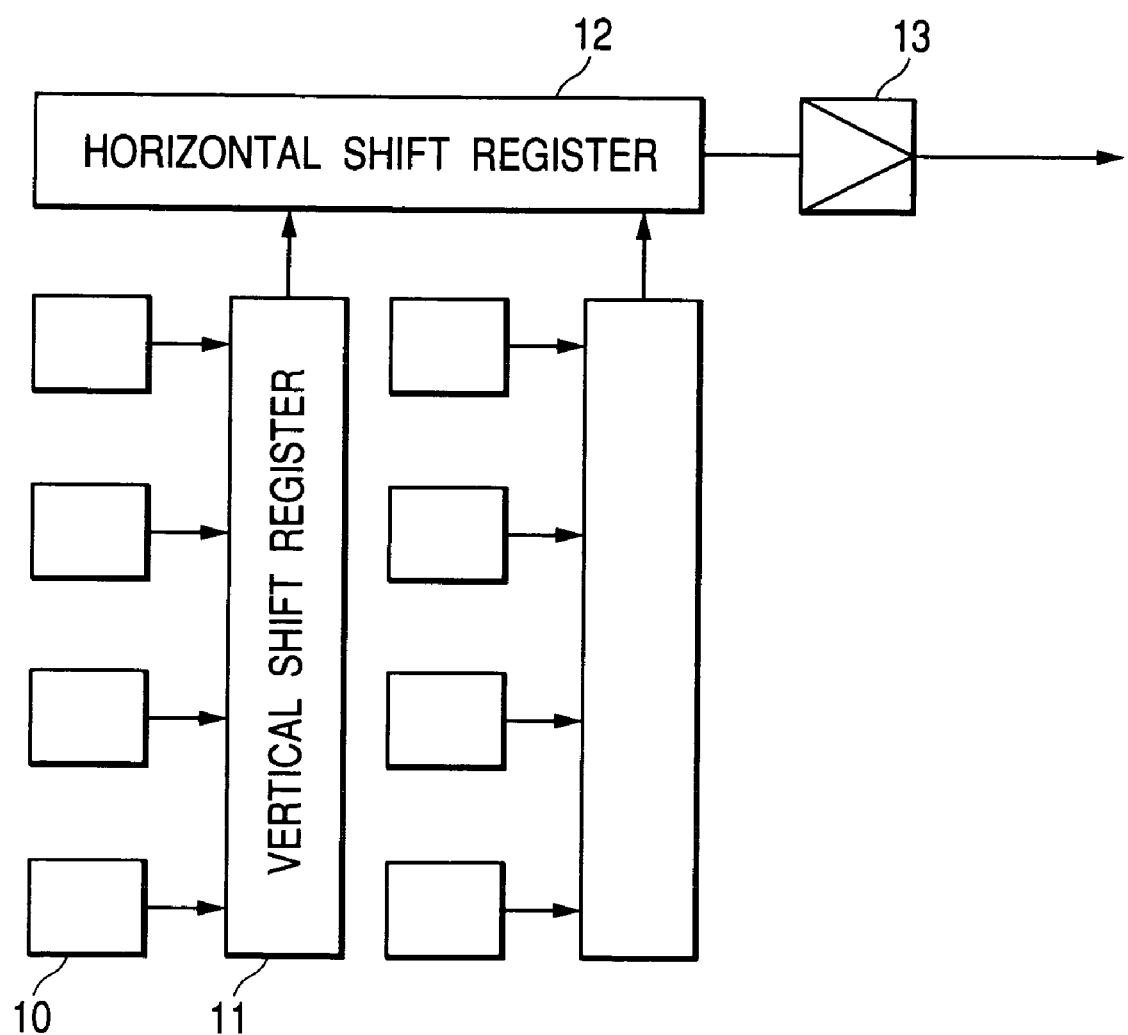
FIG. 5 is a diagram showing a CCD sensor.
Figure 6A:
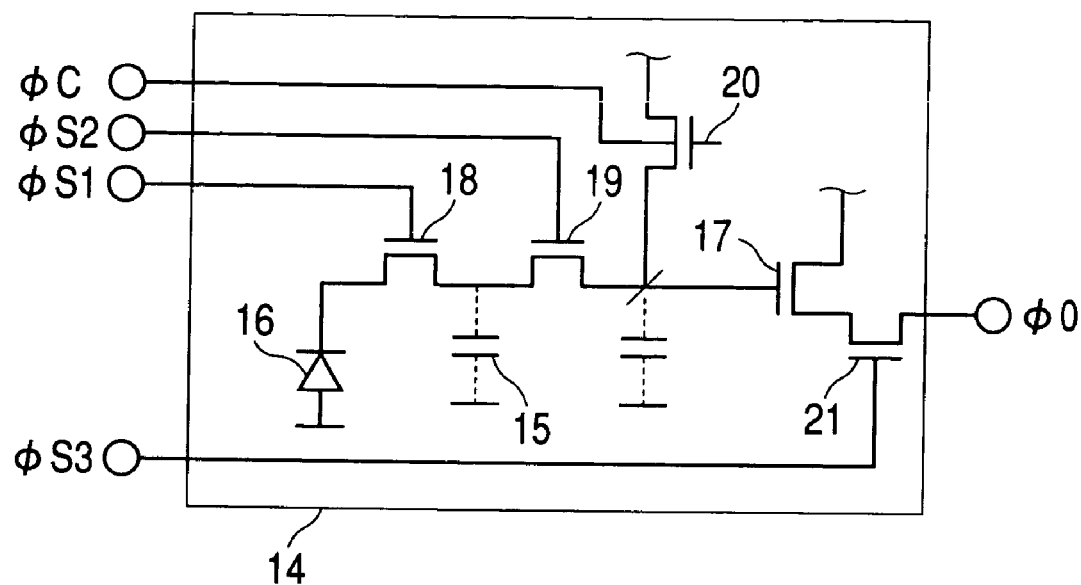
FIGS. 6A and 6B are diagrams showing one pixel in the CCD sensor.
Figure 6B:
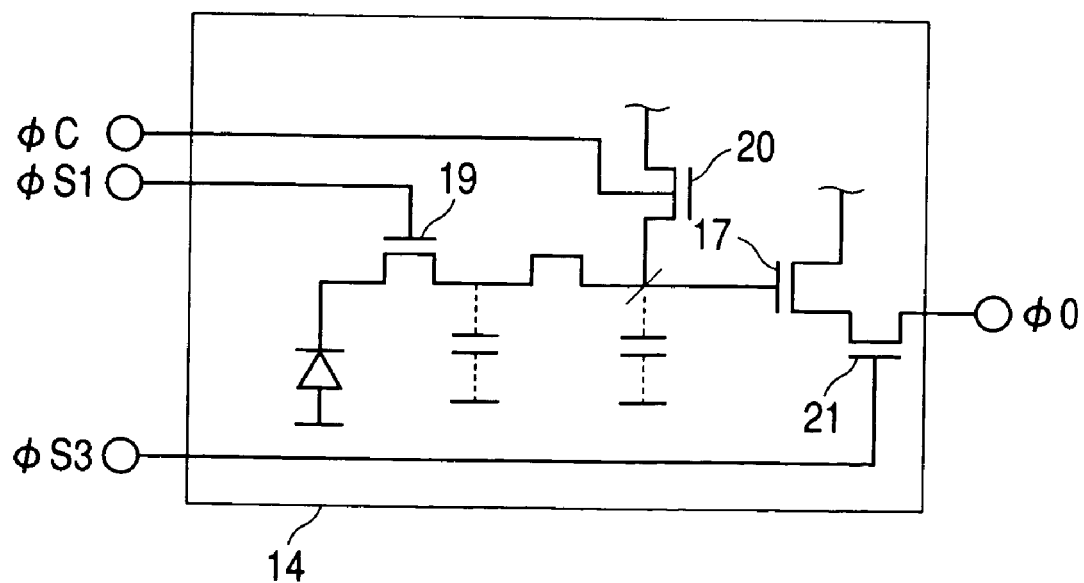

FIG. 5 is a specific diagram showing the overall structure of a CCD sensor, FIGS. 6A and 6B are diagrams showing the structure of a unit pixel for a CMOS sensor, and FIG. 7 is a specific diagram showing the overall structure of the CMOS sensor.

As is shown in FIG. 5, in the CCD sensor, exposure for each pixel 10 is started by simultaneously resetting all the pixels, and is terminated by simultaneously transferring, to a vertical shift register 11, signal charges that are obtained by performing photoelectric conversion for all the pixels. The photoelectric charge of the vertical shift register 11 is transferred to a horizontal shift register 12 for each line, and is thereafter output from an output amplifier 13. This driving system is the whole pixel simultaneous shutter exposure.

FIG. 6A shows a unit pixel of a CMOS sensor having a pixel memory 15 for each pixel 14, and a unit pixel of a CMOS sensor that does not have a pixel memory for each pixel 14 is shown in FIG. 6B.

In FIG. 6A, the CMOS sensor comprises: a photoelectric conversion portion 16; an amplifier 17 for amplifying a signal charge received from the photoelectric conversion portion 16 and outputting the resultant signal; a first transfer switch 18 for transferring to the image pixel 15 a signal charge received from the photoelectric conversion portion 16; a second transfer switch 19 for transferring to the amplifier 17 a signal charge obtained from the image pixel 15; a reset switch 20 for resetting the input terminal of the amplifier 17; and a select switch 21 for selecting a pixel that is to be read.

The CMOS sensor in FIG. 6B does not have the first transfer switch 18 in FIG. 6A.

FIG. 7 is a specific diagram showing the general structure of a CMOS sensor having the pixel structure shown in FIG. 6A or 6B.

When the CMOS sensor shown in FIG. 7 is employed to perform the whole pixel simultaneous shutter exposure, each pixel is formed as shown in FIG. 6A. The exposure is started by resetting all the pixels 14 with a drive pulse φC from a vertical scanning circuit 25. Then, the signal charges of all the pixels 14 are transferred to the pixel memories 15 by a drive pulse φS1. Next, for each pixel row, the reset noise (a signal obtained by resetting the input terminal of a pixel amplifier) of the pixel amplifier is transferred to a noise removing circuit 26 by a drive pulse φS3. Following this, under the control with drive pulses φS2 and φS3, a signal in the memory is transferred through the pixel amplifier to the noise removing circuit 26. Thereafter, the differential process is performed on the received signals to remove the reset noise.

When the CMOS sensor in FIG. 7 is to perform the rolling shutter exposure, each pixel which has the structure shown in FIG. 6A is used.

First, a vertical scanning circuit 25 resets each pixel row in order, and after an arbitrary exposure time has elapsed, reads signals pixel rows row by row. The noise removal for a pixel amplifier is performed in the same manner as described above.

The signal obtained by the noise removal is transferred from a horizontal scanning circuit 27 to the succeeding output amplifier 28.

The general configuration and the operation of an image pickup apparatus according to the embodiment will now be described while referring to FIG. 8.

The image pickup apparatus comprises: a sensor 30 for picking up an image of an object. Specifically, this sensor 30 is the one shown in FIG. 5 or 7 explained above, and this sensor 30 includes a flicker sensor area 31a which is formed on the same semiconductor substrate to detect flicker. One of a plurality of pixels in FIG. 5 or 7 may be employed for the flicker sensor area 31, or the flicker sensor area 31a may be formed separate from the pixel area or may be arranged on a different semiconductor substrate from the substrate whereon the sensor 30 is mounted.

The image pickup apparatus further comprises: an analog processing unit 31 for performing analog control, such as gain control, on a signal received from the sensor 30; an analog/digital conversion unit 32 for converting an analog signal received from the analog processing unit 31 into a digital signal; an image processing unit 33 for performing image processes, such as a gamma process and a color process, on the digital signal; a pattern recognition unit 34 for performing fingerprint verification based on a pre-registered fingerprint and a fingerprint detected by the sensor 30; an LED (light source) 35 for emitting light; an LED driving unit 36 for driving the LED 35; a sensor drive unit 37 for driving the sensor 30; a flicker detection unit 39 for detecting an amount of signals in the flicker sensor area 31a; and a system control unit 40 for controlling the overall image pickup apparatus and for determining the exposure time, the ON/OFF state of the LED 35 and the light intensity on the basis of a signal received from the flicker detection unit 39 to control the sensor drive unit 37 and the LED drive unit 36.

The flicker detection unit 39 can detect the state of a flicker shown in FIG. 3 or 4. Specifically, the flicker detection unit 39 detects the amount of a signal whose level is changed in consonance with a constant period shown in FIG. 3 or 4.

In the above description, the image pickup apparatus controls both the LED and the exposure period for the sensor; however, the apparatus may control only either of them.

As is described above, since the image pickup apparatus of this embodiment comprises the sensor 30 which is an image pickup unit for picking up the image of an object, the flicker detection unit 39 which is a detection circuit for detecting flicker, and the system control unit 40 which is a correction circuit for adjusting the image pickup condition of the sensor 30, an image can be acquired without being affected by flicker.

The above described configuration is used in common for second to fourth embodiments that will be described later.

FIG. 9 is a diagram for explaining a specific example for adjusting the image pickup condition.

In this example, the exposure having a light amount of 60% or lower, whereby a flicker is caused, is inhibited. This level is set in accordance with the specification of the image pickup apparatus because this setting of the level depends on the method and the accuracy of the fingerprint verification.

In FIG. 9, a driving timing A is used for the whole pixel shutter exposure, and a driving timing B is used for the rolling shutter exposure. For a flicker, "H", of a pulse Ts, denotes an exposure permission period, and "L" denotes an exposure stop period.

For the driving timing A, either the CCD sensor in FIG. 5 or the CMOS sensor in FIG. 7 having the pixel structure in FIG. 6A is employed.

A pulse A1 defines the whole pixel simultaneous resetting period, and a pulse A2 defines a whole pixel charge simultaneous transfer period wherein photoelectric conversion signals are transmitted from the pixel units to the memory (the vertical shift register for the CCD). The interval T1 between the pulse A1 and the pulse A2 is an exposure period. During the period defined by a pulse A3, a signal is sequentially read from the area sensor row by row.

For the driving timing B, the CMOS sensor in FIG. 7 having the pixel structure shown in FIG. 6B is employed.

A pulse B1 defines a period wherein pixel rows are sequentially reset, and a pulse B defines a signal transfer period wherein signals are sequentially transferred from the individual pixel rows to the pixel amplifier. T1 is an exposure period of the first pixel row, and T2 is an exposure period of the second pixel row. A pulse B3 defines a period wherein signals are sequentially read from the individual pixel rows.

As is described above, the sensor drive unit 37 is so controlled that the sensor 30 can perform an exposure (an accumulation of optical charges) while avoiding exposure in a period for a small amount of light from which a flicker is generated, i.e., since in accordance with the detection of a flicker the system control unit 40, which is the correction unit, adjusts the drive condition of the sensor 30 that is the image pickup unit, fingerprint recognition can be accurately performed for a fingerprint image that is read.

Second Embodiment

FIG. 10 is a diagram for explaining a specific example for adjusting the image pickup condition.

In this embodiment, a flicker is detected, and during a period when a flicker is generated from a small amount of light, the amount of light emitted to irradiate a finger is increased by turning on the LED 35, in order to reduce the flicker for a fingerprint image.

A pulse A represents an example for the ON/OFF state of the LED 35; "H" is an ON period and "L" is an OFF period.

A pulse B represents an example for the ON level of the LED 35; "H" is a high ON period and "M" is a low ON period.

A pulse C represents an example wherein the ON level of the LED 35 is controlled during the rolling shutter exposure period. A pulse C1 defines a reset period, a pulse C2 defines a pixel signal transfer period, and the interval between the pulse C1 and the pulse C2 is an exposure period Ts of each pixel row. A pulse C3 represents an example wherein the ON level of the LED 35 is changed during the exposure period Ts, and a pulse C4 represents an example wherein the ON period is controlled.

A pulse D represents an example wherein the amount of light emitted by the LED 35 is set considerably larger than the fluorescent light flicker. In this case, the rolling shutter exposure period is reduced to prevent an increase in the amount of signals.

As is described above, in accordance with the flicker detected by the flicker detection unit 39, which is a detection circuit, the system control unit 40, which is a correction circuit, adjusts the ON timing of the LED 35 which is a light source. Therefore, fingerprint recognition can be accurately performed for a fingerprint image that is picked up.

Third Embodiment

Figure 11A:
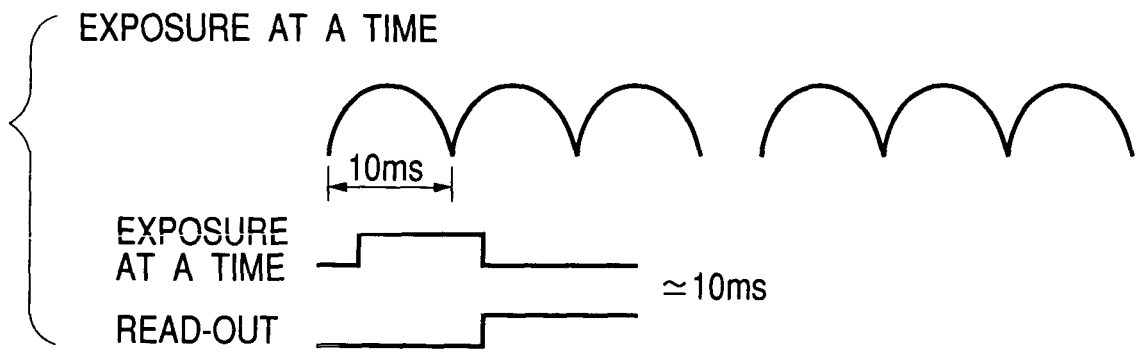
FIGS. 11A and 11B are diagrams for explaining the third embodiment.
Figure 11B:
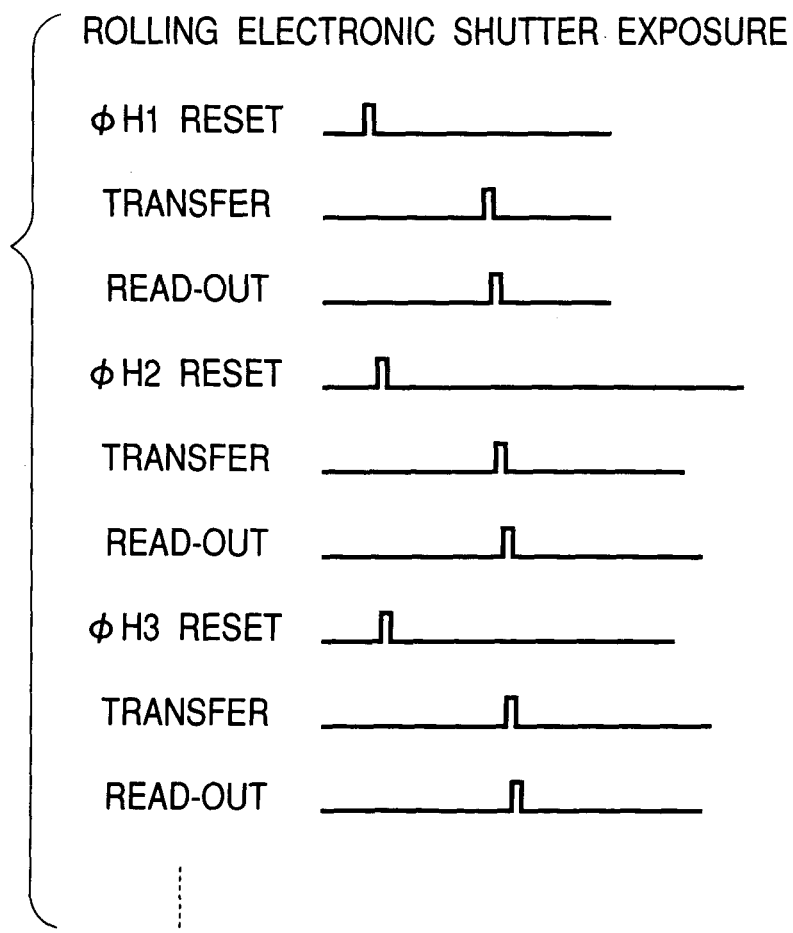

FIGS. 11A and 11B are diagrams for explaining specific examples for adjusting the image pickup condition.

In this embodiment, when a flicker is detected, the exposure period of the sensor 30 is substantially equal to a flicker period. The whole pixel simultaneous shutter exposure example is shown in FIG. 11A, and the rolling shutter exposure period is shown in FIG. 11B. φH1, φH2, . . . define the reset, the transfer and the reading of the individual pixel rows. In this embodiment, the brightness set of ordinary fluorescent light is set, and the optical design and the sensor sensitivity design are performed in accordance with the brightness which is set. When, as the AD detection results, the brightness of fluorescent light differs from the setup value, a gain control circuit controls either a signal gain or the amount of light emitted by the LED 35.

As is described above, in accordance with the flicker detection performed by the flicker detection unit 39, which is a detection circuit, the system control unit 40, which is a correction circuit, substantially adjusts the photoelectric charge accumulation period of the sensor 30 which is an image pickup unit, so as to become nearly equal to the period of a flicker. Thus, fingerprint recognition can be accurately performed for a fingerprint image that is picked up.

Fourth Embodiment

Since an AE detection unit is provided to detect the amount of signals output by the sensor 30, the exposure period of the sensor 30 can be controlled in real time.

Figure 1:
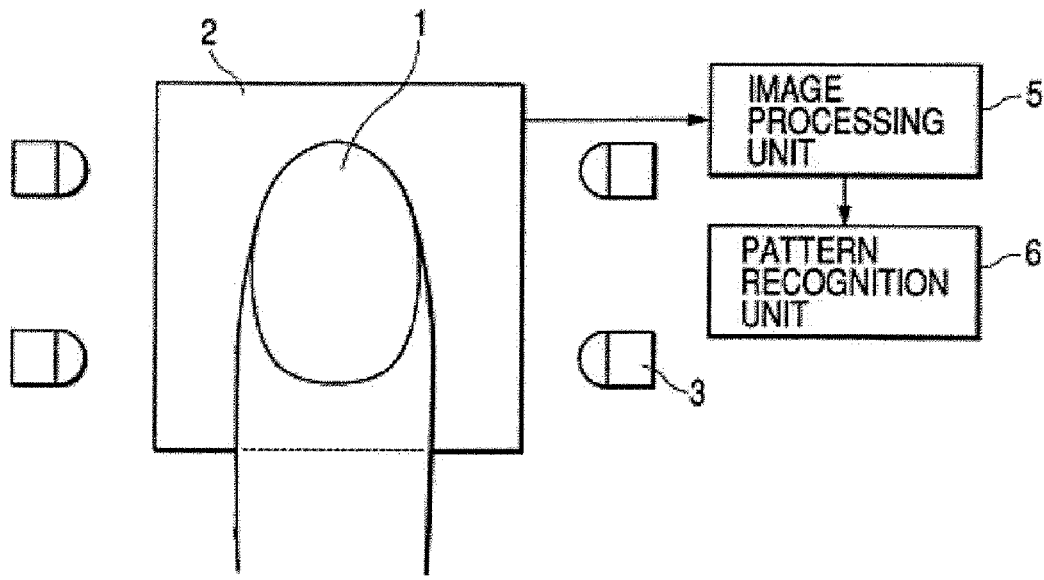
FIG. 1 is a diagram showing a fingerprint recognition apparatus.
Figure 2:
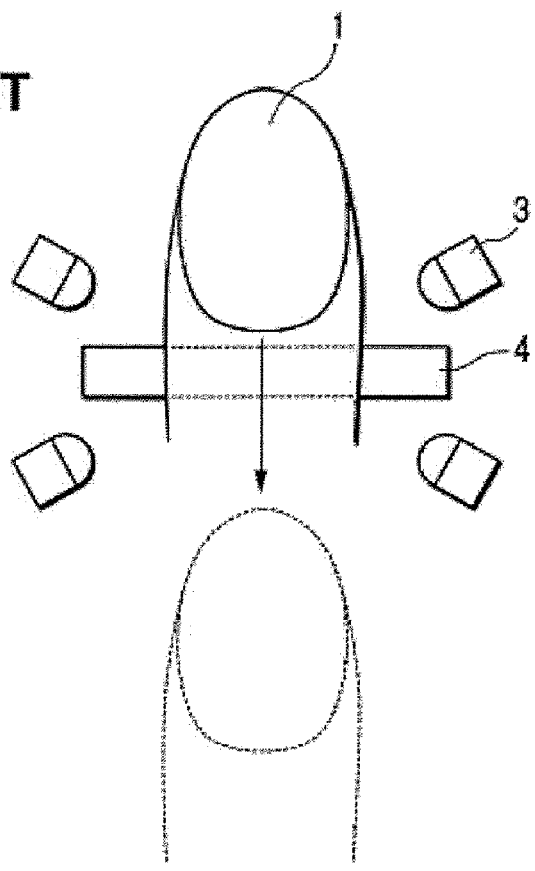
FIG. 2 is a diagram showing another fingerprint recognition apparatus.

This configuration is effective for a scan type whereby a fingerprint image is picked up while moving a finger across a sensor having about 25 pixel rows as shown in FIG. 2.

Instead of providing the AE detection unit separate from the flicker detection unit 39, a signal provided by the flicker detection unit 39 may be employed to perform the AE control process.

Fifth Embodiment

Figure 12:
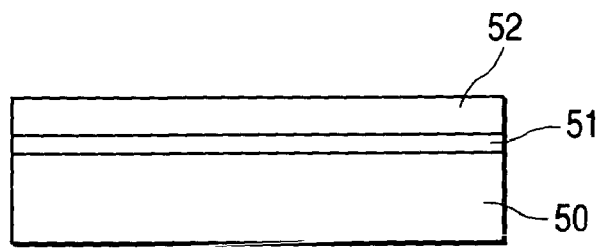
FIG. 12 is a diagram for explaining a fifth embodiment.

A fifth embodiment wherein a flicker is reduced without detection of a flicker is shown in FIG. 12. As is shown in FIG. 14, emission spectrum of an LED (850 nm in this embodiment) that emits light for fingerprint verification differs greatly from that of a fluorescent light tube (e.g., a three-wavelength fluorescent light tube) that emits visible light.

A sensor used for this embodiment is the same as that used for the first embodiment.

When a filter (or a band-pass filter) 51 for blocking and reducing the emission energy of fluorescent light is arranged on a sensor, the fluorescent light that causes a flicker can be blocked, i.e., a flicker problem can be solved. Instead of an LED of 850 nm, an LED of 950 nm or another infrared LED may be employed, and only a filter that is appropriate for an LED need be employed to block the fluorescent light.

Figure 14:
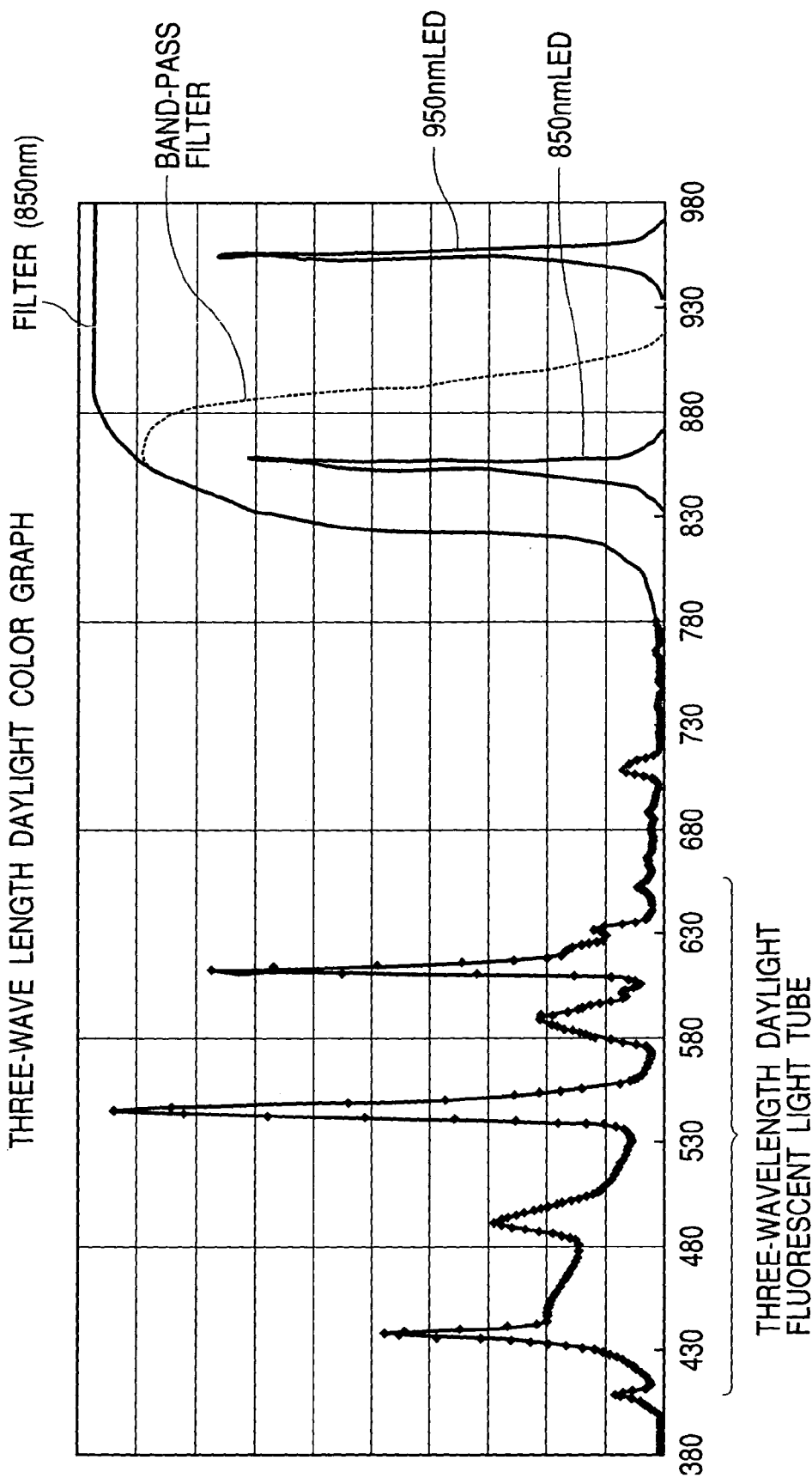
FIG. 14 is a diagram for explaining the fluorescent light and LED spectrums.

Further, as is shown in FIG. 12, a filter 51 having a characteristic shown in FIG. 14 may be formed on the sensor 50, and thin glass 52 (or an FOP or a coating material) may be provided thereon as a sensor protection member. The filter 51 may be formed so that photoelectric conversion occurs at a deeper location in a PN junction for pixels, or may be formed by being mixed with the core member of the FOP or with the coating material. When an Si material is employed for the filter 51 and the glass 52, these components obtain a band-pass characteristic shown in FIG. 14, and can also be employed as sensor protection members. At this time, when the Si has a thickness of 50 to 100 μm, the band-pass characteristic for the short wavelength is obtained based on the transmittance characteristic of the Si material, while the long wavelength characteristic is determined based on the sensitivity characteristic that depends on the Si band gap.

As for the filter (used for the transmission wavelength of 850 nm) in FIG. 14, since a dyeing color filter that presently is frequently employed can reduce fluorescent light to $1/10$ its original strength or lower, the flicker detection process is not required. In this case, this filter must be employed for the AE sensor to prevent the degrading of the AE accuracy.

Further, since the influence of external light can be removed so long as only the LED light can be passed through, the fingerprint sensor can be driven merely by using the LED light, and control of the amount of light is not required for fingerprint recognition.

For the scan type, the reduction of a flicker under fluorescent light is an important subject. When the time period during which a finger is scanned by the sensor is 0.1 second at the minimum, a flicker is always generated during this period. In order to unconditionally reduce the occurrence of a flicker, the amount of light emitted by the LED need only be increased until it is one digit higher than the amount of fluorescent light.

Then, the flicker element is reduced to 10% or lower, and its influence on fingerprint recognition can be ignored.

Sixth Embodiment

Figure 13:
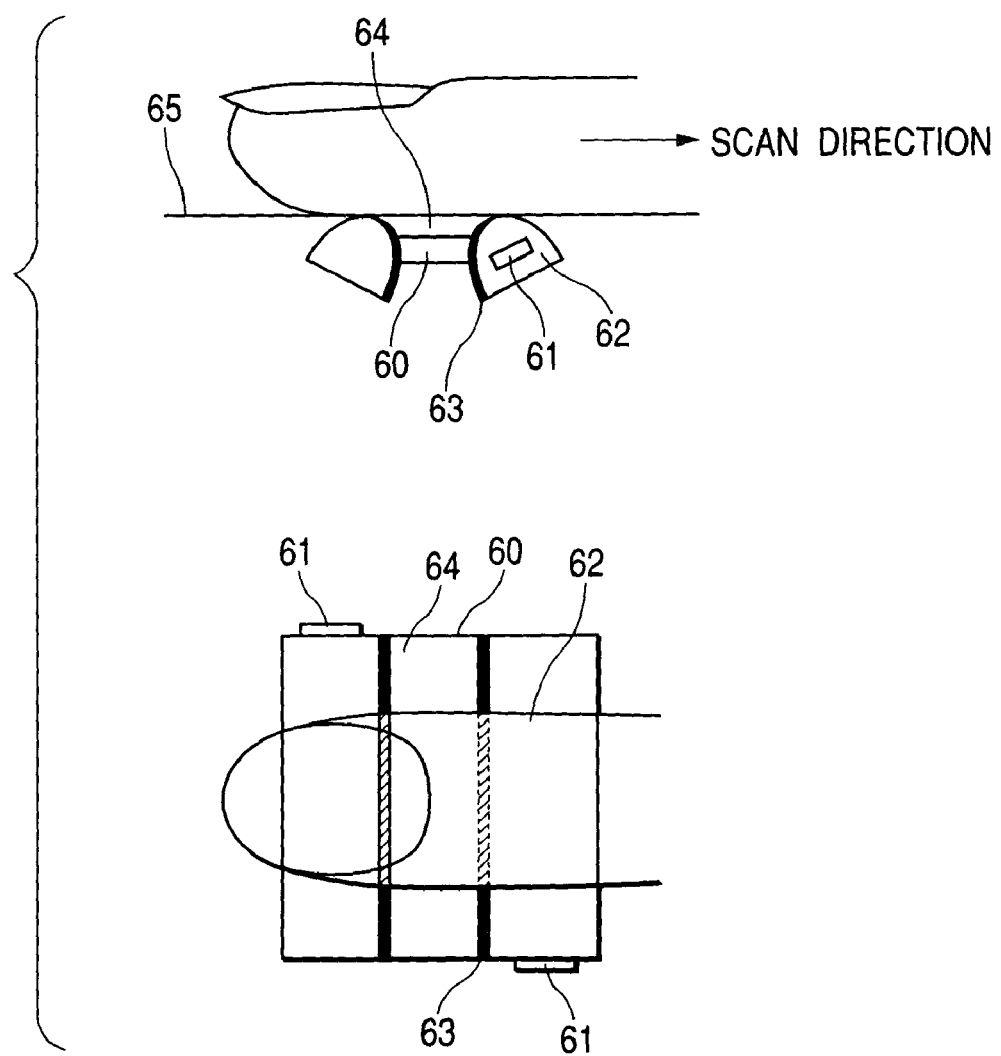
FIG. 13 is a diagram for explaining a sixth embodiment.

In FIG. 13, a sensor 60 (a scan type sensor) have about 25 pixel rows, and a finger is irradiated by the LED light from the bottom. An LED 61 emits light; light guiding member 62 guides light emitted by the LED 61; and a light shielding member 63 shields the LED light. The reference numerals 64 and 65 denote a cover glass and a housing respectively.

Unlike an area sensor that has, for example, about 500 pixel arrays, the scan type sensor 60 has only a small fingerprint scanning portion, so that, along the light guiding member 62, the LED light can be satisfactorily collected to irradiate a finger placed on the sensor 60. With the light guiding member 62, the collecting power can be increased by at least at one digit. The number of LEDs may be limited to one so long as that LED is provided on the side face of one of the light guiding member 62. To avoid the shades of the light guiding members 62, these members 62 need only be arranged along both sides of the sensor 60 as is shown in FIG. 13, so that their effect is minimized. However, since the sensor is short, i.e., about 2 centimeters, the shading can be almost wholly ignored, depending on the light guiding member 62, and in this case, only one light guiding member 62 need be provided.

It is effective for the light shielding member 63 for blocking LED light to be located between the light guiding member 62 and the sensor 60. Without the light shielding member 63, the LED light would leak and adversely affect the sensor 60. For example, the LED light would become flare light and reduce the dynamic range of a signal.

The semiconductor sensor used for the invention may be either a CCD sensor, a CMOS sensor or an amorphous sensor. The flicker reduction method is not limited to an exposure system, such as the whole pixel simultaneous shutter exposure system or the rolling shutter exposure system, and another method can be employed.

The pattern recognition unit for the fingerprint image can cope with an arbitrary method, such as an image pattern comparison method, a feature comparison method or a frequency analysis method.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus for reading a fingerprint image comprising:
    an image pickup unit for picking up an image of an object;
    a detection circuit for detecting a flicker; and
    a light source for irradiating the object with a light, wherein the image pickup apparatus comprises further
    a control unit for controlling, based on a result of a detection by the detection circuit, the image pickup unit per each one period of the flicker so as not to accumulate photoelectric charges during a period in which an amount of light that causes the flicker is a predetermined value or smaller.

2. The image pickup apparatus according to claim 1, wherein
    a period of accumulating the photoelectric charges per each one pixel of the image pickup unit is shorter than the one period of the flicker.

3. An image pickup apparatus for reading a fingerprint image comprising:
    an image pickup unit for picking up an image of an object;
    a detection circuit for detecting a flicker; and
    a light source for irradiating the object with a light, wherein the image pickup apparatus comprises further
    a control unit for controlling, based on a result of a detection by the detection circuit, the light source per each one period of the flicker such that the light source emits light during only a period in which the amount of light that causes the flicker is a predetermined value or smaller.

4. The image pickup apparatus according to claim 3, wherein
    a period of accumulating photoelectric charges per each one pixel of the image pickup unit is shorter than the one period of the flicker.

5. An image pickup apparatus for reading a fingerprint image comprising:
- an image pickup unit for picking up an image of an object;
- a detection circuit for detecting a flicker; and
- a light source for irradiating the object with a light, wherein the image pickup apparatus comprises further
- a control unit for controlling, based on a result of a detection by the detection circuit, the light source per each one period of the flicker such that a quantity of light emitted from the light source during a period in which the amount of light that causes the flicker is a predetermined value or smaller is larger than a quantity of light emitted from the light source during a period in which the amount of light that causes the flicker is larger than the predetermined value.

6. The image pickup apparatus according to claim 5, wherein
- a period of accumulating photoelectric charges per each one pixel of the image pickup unit is shorter than the one period of the flicker.

* * * * *